June 24, 1952  C. G. BEATTY  2,601,678
MEASURING APPARATUS

Filed Feb. 10, 1950  2 SHEETS—SHEET 1

FIG. I.

WITNESSES:

INVENTOR
Charles G. Beatty.
BY
ATTORNEY

June 24, 1952  C. G. BEATTY  2,601,678
MEASURING APPARATUS
Filed Feb. 10, 1950  2 SHEETS—SHEET 2

INVENTOR
CHARLES G. BEATTY
BY
ATTORNEYS

Patented June 24, 1952

2,601,678

UNITED STATES PATENT OFFICE 2,601,678

MEASURING APPARATUS

Charles G. Beatty, Pittsburgh, Pa., assignor, by mesne assignments, to the United States of America as represented by the Secretary of the Navy Application February 10, 1950, Serial No. 143,560

6 Claims. (Cl. 201—48)

This invention relates generally to apparatus responsive to physical quantities and more in particular to an apparatus for measuring the rate of flow of a fluid medium.

One object of this invention is to provide a device responsive to a physical quantity which is simple in its elements and positive and accurate in its operation.

Another object of this invention is to provide an apparatus responsive to fluid flow which is usable in the measurement of fluid velocities of small magnitude.

Another object of this invention is to provide a device of the class described usable in the measurment of the rate of flow of liquids, which device is immersible in the liquid and operable under conditions of high liquid pressure.

The foregoing statements are merely illustrative of the various aims and objects of this invention. Other objects and advantages will become apparent upon a study of the foregoing specification when considered in conjunction with the accompanying drawing, in which Fig. 1 is a schematic view in section of a fluid flow responsive device embodying the principles of this invention.

Figure 1:
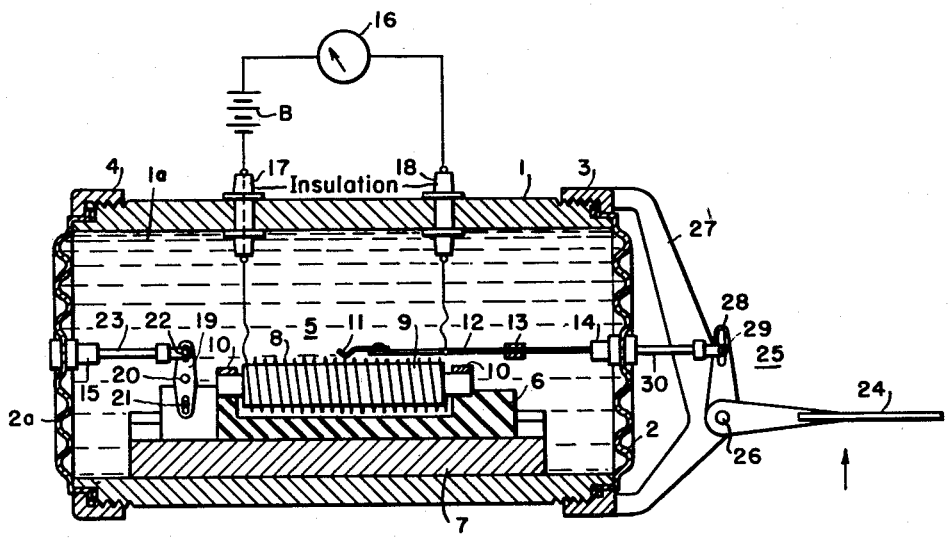
Figure 2:
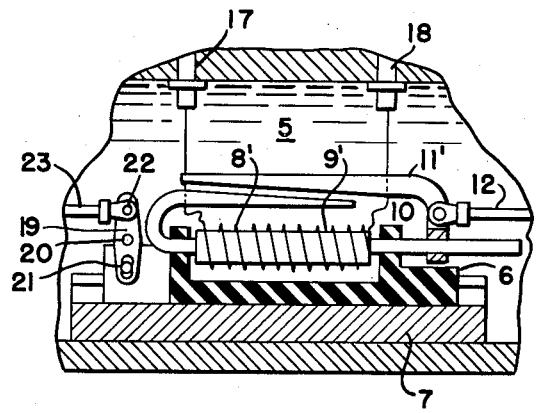
Figure 3:
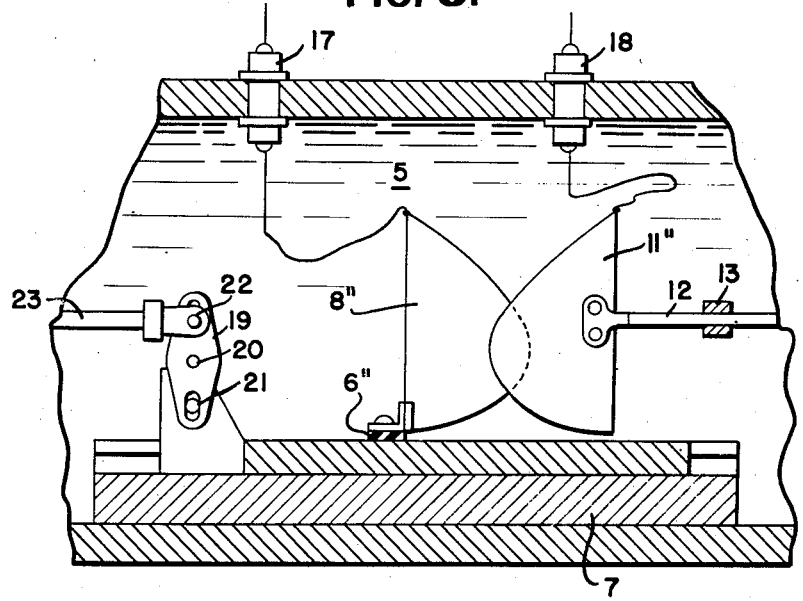

Fig. 2 illustrates replacement of the resistance element of Fig. 1 by an electromagnetic element and Fig. 3 illustrates replacement of the resistance element by a capacitative element.

The general problem herein is to provide a fluid flow responsive device which is capable of measuring small vertical rates of movement of submarine craft, such as submarines and torpedoes. The indication obtained from the device in the form of an electrical quanity or in the form of a deflection of an instrument being usable in connection with controlling the craft in the vertical plane.

Equipment utilized in such an application must, of course, be capable of withstanding large fluid pressures, must be insensitive to variations in the fluid pressures and at the same time insensitive to temperature excursions which are encountered.

In general, in accomplishing these ends, a device has been provided which includes a variable impedance member including a pair of relatively movable variable impedance elements. These elements are moved in opposite directions in dependence of fluid flow and are moved in the same direction in dependence of fluid pressure and fluid temperature changes. Thus, it will be appreciated that the variable impedance member is sensitive to fluid flow but relatively insensitive to pressure and temperature variations.

The physical embodiment of the apparatus functioning according to the generalities hereinabove outlined includes a tubular housing 1 which may be of metal or any other suitable material capable of withstanding the operating conditions. The tubular member 1 is externally threaded at both of its extremities and is closed at each end by means of the flexible diaphragms 2 and 2a, respectively. The flexible diaphragms may be of metal of any suitable resilient material. These diaphragms are preferably bonded to the ends of the tubular member and mechanical strength imparted to the assembly by means of the flange nuts 3 and 4 which respectively thread over the ends of the tubular member 1 and securely seat upon outwardly flanged portions of the flexible diaphragms 2 and 2a, thus sealing the tubular member and forming a fluid tight chamber therewithin. This chamber is completely filled with oil 1a so as to eliminate all air pockets and therefore, in effect, to provide a mechanical connection between the diaphragms 2 and 2a.

Within the chamber of the tubular member and completely immersed in the oil therein, a variable resistor assembly generally designated 5, is carried upon a rack 6 which in turn is slidably mounted in a guide 7 secured to the inner wall of the tubular member 1. As a substitute for guide 7 the rack 6 may be supported on flat springs fastened at their bottom ends to the tubular member 1 and at their top ends fastened to rack 6, the springs being arranged in parallel relation at each end of rack 6 and affording a single degree of freedom of movement of the rack and resistor assembly in the same directions as afforded by the guide 7.

As illustrated, the variable resistor 5 is of the wire wound type including a resistor wire 8 wound or otherwise suitably fastened upon a suitable form 9 secured by clamps 10 upon the rack 6. The movable tap 11 of this resistor is connected to a rod 12 which may be guided in a suitable bearing 13 secured at diametrically opposite points in the tubular member and which rod is connected by a suitable fastening means 14 to the center point of the inner face of the flexible diaphragm 2. Thus, it will be appreciated that movement of the diaphragm 2 will actuate the movable tap 11 with respect to the turns of resistance wire 8 to effect a change of resistance in the circuit including the battery B and the indicating instrument 16, diagrammatically illustrated in the figure. This circuit as shown extends through bushings 17 and 18 in the wall of the tubular member 1 forming a fluid tight connection of the external circuit with the internal circuit including one end of the resistor and the movable tap.

The resistor rack is actuated by the diaphragm 2a. This connection is accomplished by means of a lever 19 which is pivotally mounted at 20 by a suitable supporting means (not shown) secured to the inner wall of the tubular member. The point of pivoting 20 lies between the extremities of the lever. The extremities of the lever are slotted longitudinally thereof, at the bottom end of, as viewed, to receive a pin 21 secured in the left-hand end of the resistor rack 6, and to receive in the upper slot thereof a pin 22 mounted in the forked extremity of a rod 23 connected by suitable fastening means 15 to the central portion of the inside face of the flexible diaphragm 2a. Thus, it will be appreciated that upon deflection of the movable diaphragm 2a and assuming this deflection is inwardly of the chamber within the tubular member 1, the lever 19 will be rotated clockwise as viewed, to move the resistor rack 6 to the left in a direction opposite to the displacement of the actuating diaphragm 2a.

Either diaphragm may be actuated by a suitable biasing means responsive to the flow of fluid medium in which the fluid flow responsive device is immersed. As illustrated, the diaphragm 2 has applied thereto a force proportional to fluid flow by means of a flat plate 24 which is mounted at the free extremity of a bell crank 25, which bell crank is pivotally mounted on a pin 26 carried by suitable slots 27 which are connected to the flange nut or ring 3. The remaining extremity 28 of bell crank 25 is slotted longitudinally of the bell crank arm to receive therein a pin 29 passing through the forked extremity of a rod 30 which is secured to the outer face of the diaphragm 2 substantially coaxially of the rod 12 secured to the inside face of this diaphragm.

Thus assuming a flow of fluid past the device in the direction indicated by the arrow beneath the flat plate 24, the flat plate 24 will effect counterclockwise rotation of bell crank 25 applying a thrust towards the left to the diaphragm 2 tending to move the movable tap 11 to the left along the resistor 5. Displacement of the diaphragm 2 to the left shifts the volume of fluid towards the left exerting a force towards the left upon the diaphragm 2a effecting a displacement thereof in exact correspondence with that of the diaphragm 2. This latter displacement rotates the lever 19 about its pivot 20 in a counterclockwise direction moving the resistor rack towards the right as viewed, thus adding an additional resistance change to that effected by movement of the tap 11 alone and in effect doubling the sensitivity of the system to the fluid flow.

With the assembly indicated, it will be noted that increasing fluid pressure exerts an inwardly directed force upon both of the flexible diaphragms 2 and 2a. Displacements which may occur from these forces due to the compressibility of the dielectric fluid medium, for example, oil contained within the chamber, result in simultaneous movement of the movable tap 11 and the resistor assembly 5 in the same direction. By making the ratio of the moment arms of the lever 19 equal to unity, the movement of the resistor and the tap can be made equal and as a consequence, no change in relative position of the tap with respect to the resistor will occur.

Changes in temperature of the dielectric fluid medium which cause changes in volume thereof will result in forces on the diaphragm assemblies either inwardly or outwardly depending upon the direction of volume change of the dielectric fluid volume. In a manner similar to that described in connection with compensation for fluid pressure changes, the resistor and its movable tap are maintained in the same relative position by the linkage with the two diaphragm assemblies and again preventing a change in the relative positioning of the parts.

It will be appreciated that other types of variable impedance elements may be substituted for the variable resistor indicated. For instance, an electromagnetic device having a movable armature may be utilized in which case the core and coil of the device may be mounted on the resistor rack 6 and the armature connected to the rod 12 to be moved thereby. This is illustrated in Fig. 2 wherein the same parts bear the same reference characters as in Fig. 1 and parts bearing the primed characters refer to corresponding parts of Fig. 1 bearing unprimed characters. Movement of rod 12 moves armature 11' to increase the inductance or impedance of coil 8'. Likewise, a capacitor assembly including a pair of relatively movable elements may be substituted for the resistor unit. This is similarly illustrated in Fig. 3, wherein the rack 6'' carries the impedance member 8'' and the impedance varying element 11'', activated by rod 12. Magnetic and capacitative modifications may, of course, be fed by an A. C. source rather than a battery B. It will also be appreciated that a carbon pile resistor unit may be utilized in the assembly in place of that illustrated. The carbon pile unit may be positioned in the resistor rack in the manner illustrated for the wire wound resistor. In this assembly, however, the rod 12 would abut one end of the carbon pile unit and the lower extremity of the lever 19 would abut the other extremity. A similar mechanical arrangement may be utilized upon the substitution of a magnetostrictive type electromagnet device for the carbon pile resistor unit.

It will therefore be appreciated by those skilled in the art that numerous variations in the design of this device, as well as in the application of this device, may be made without departing from the spirit and scope of this invention. Thus, it is intended that the foregoing disclosure and the illustration of the drawing are to be interpreted only as illustrative of the principles of this invention and not construed in a limiting sense.

I claim as my invention:

1. In a device responsive to a physical quantity, the combination of, a tubular member, flexible diaphragm means at each end of said tubular member sealing the ends of said tubular member, a dielectric fluid medium filling said tubular member, a variable impedance device having a pair of relatively movable impedance varying elements, means connecting one of said relatively movable elements to one diaphragm means to be moved thereby in the same direction as said one diaphragm means moves, means connecting the other of said relatively movable elements to the other diaphragm means to be moved thereby in a direction opposite to the movement of said other diaphragm means and means for applying a force to one diaphragm means in dependence of the physical quantity.

2. In a device responsive to the flow of a fluid, which device is adapted to be immersed in the fluid medium, the combination of, a tubular member, a flexible diaphragm assembly at each end of the tubular member sealing the ends of said tubular member, a dielectric fluid medium filling said tubular member, a variable impedance device having a pair of relatively movable impedance varying elements, means connecting one of said relatively movable elements to one diaphragm assembly to be moved thereby in the same direction as the movement of said one diaphragm assembly, means connecting the other relatively movable element to the other diaphragm assembly to be moved thereby in a direction opposite to the movement of said other diaphragm assembly, fluid flow responsive means and means connecting said fluid flow responsive means to one of said diaphragm assemblies to effect movement thereof in dependence of fluid flow.

3. In a device responsive to the flow of a fluid, which device is adapted to be immersed in the fluid medium, the combination of, a tubular member, a flexible diaphragm assembly at each end of the tubular member sealing the ends of said tubular member, a dielectric fluid medium filling said tubular member, a variable impedance device having a pair of relatively movable impedance varying elements, means connecting one of said relatively movable elements to one diaphragm assembly to be moved thereby in the same direction as the movement of said one diaphragm assembly, means connecting the other relatively movable element to the other diaphragm assembly to be moved thereby in a direction opposite to the movement of said other diaphragm assembly, a flat plate, means mounting said plate for movement with respect to said tubular member with the surface of said plate normal to the path of fluid flow, and means mechanically connecting said flat plate to one diaphragm assembly.

4. In a device responsive to a flow of fluid, which device is adapted to be immersed in the fluid medium, the combination of, a tubular member, a flexible diaphragm assembly sealing each end of the tubular member, a dielectric fluid medium filling said tubular member, a variable resistor having a movable tap, means connecting the movable tap to one diaphragm assembly to be moved thereby in the direction of movement of said one diaphragm assembly, means connecting the resistor to the other diaphragm assembly to be moved thereby in a direction opposite to the movement of said other diaphragm assembly, and means responsive to fluid flow for biasing one diaphragm assembly.

5. Apparatus as set forth in claim 4 in which said last named means comprises a flat plate, means movably supporting said flat plate with respect to said tubular member, and means connecting said flat plate to one diaphragm assembly.

6. Apparatus as defined in claim 4 in which said means connecting said resistor to the other diaphragm means comprises a lever, means pivotally mounting said lever between the ends thereof, means connecting said other diaphragm means to one end of said lever and means connecting the resistor to the other end of said lever.

CHARLES G. BEATTY.

REFERENCES CITED

The following references are of record in the file of this patent:

UNITED STATES PATENTS

| Number | Name | Date |
|---|---|---|
| 1,971,238 | Silling | Aug. 21, 1934 |
| 2,264,487 | Smulski | Dec. 2, 1941 |